US008930322B2

(12) United States Patent
Weissman et al.

(10) Patent No.: US 8,930,322 B2
(45) Date of Patent: *Jan. 6, 2015

(54) METHODS AND SYSTEMS FOR BULK ROW SAVE LOGIC IN AN OBJECT RELATIONAL MAPPING LAYER AND APPLICATION FRAMEWORK

(71) Applicants: Craig Weissman, San Francisco, CA (US); Steven Tamm, San Francisco, CA (US); Simon Fell, Corte Madera, CA (US); Simon Wong, San Carlos, CA (US); Steve Fisher, Los Altos, CA (US)

(72) Inventors: Craig Weissman, San Francisco, CA (US); Steven Tamm, San Francisco, CA (US); Simon Fell, Corte Madera, CA (US); Simon Wong, San Carlos, CA (US); Steve Fisher, Los Altos, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/061,647

(22) Filed: Oct. 23, 2013

(65) Prior Publication Data
US 2014/0046915 A1 Feb. 13, 2014

Related U.S. Application Data

(62) Division of application No. 11/687,477, filed on Feb. 23, 2007, now Pat. No. 8,682,863.

(60) Provisional application No. 60/849,693, filed on Oct. 4, 2006.

(51) Int. Cl.
G06F 17/30 (2006.01)

(52) U.S. Cl.
CPC .... *G06F 17/30289* (2013.01); *G06F 17/30595* (2013.01)
USPC ........................................................ 707/684

(58) Field of Classification Search
None
See application file for complete search history.

(56) References Cited

U.S. PATENT DOCUMENTS

| 4,498,145 A | 2/1985 | Baker et al. |
| 4,503,535 A | 3/1985 | Budde et al. |
| 4,933,848 A | 6/1990 | Haderle et al. |
| 4,945,474 A | 7/1990 | Elliott et al. |
| 4,947,320 A | 8/1990 | Crus et al. |
| 5,170,480 A | 12/1992 | Mohan et al. |
| 5,291,583 A | 3/1994 | Bapat |
| 5,293,615 A | 3/1994 | Amada |
| 5,313,629 A | 5/1994 | Abraham et al. |
| 5,455,944 A | 10/1995 | Haderle et al. |
| 5,560,038 A | 9/1996 | Haddock |
| 5,566,330 A | 10/1996 | Sheffield |

(Continued)

OTHER PUBLICATIONS

"Database Triggers," by Oracle. IN:_Oracle8 Concepts, Release 8.0_(1997). Available at: http://docs.oracle.com/cd/A64702_01/doc/server.805/a58227/ch15.htm.*

(Continued)

*Primary Examiner* — Daniel Kinsaul
(74) *Attorney, Agent, or Firm* — Blakely, Sokoloff, Taylor & Zafman

(57) ABSTRACT

In accordance with embodiments, there are provided mechanisms and methods for saving multiple rows together through an object relational mapping layer to a database. These mechanisms and methods for saving multiple rows together can enable embodiments to detect faults in the save operation(s) and recover. The ability of embodiments to detect faults in the save operation(s) and recover can enable embodiments to provide a robust forgiving published API that saves a set of rows together whenever possible.

20 Claims, 5 Drawing Sheets

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,752,018 A | 5/1998 | Sheffield | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,872,990 A | 2/1999 | Luick et al. | |
| 5,873,096 A | 2/1999 | Lim et al. | |
| 5,918,159 A | 6/1999 | Fomukong et al. | |
| 5,937,415 A | 8/1999 | Sheffield et al. | |
| 5,950,210 A | 9/1999 | Nelson | |
| 5,963,953 A | 10/1999 | Cram et al. | |
| 6,067,542 A | 5/2000 | Carino, Jr. | |
| 6,070,165 A | 5/2000 | Whitmore | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,185,577 B1 | 2/2001 | Nainani et al. | |
| 6,189,011 B1 | 2/2001 | Lim et al. | |
| 6,216,135 B1 | 4/2001 | Brodersen et al. | |
| 6,233,585 B1 | 5/2001 | Gupta et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,304,876 B1 | 10/2001 | Isip, Jr. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,374,236 B1 * | 4/2002 | Chen et al. | 1/1 |
| 6,377,959 B1 | 4/2002 | Carlson | |
| 6,393,605 B1 | 5/2002 | Loomans | |
| 6,405,220 B1 | 6/2002 | Brodersen et al. | |
| 6,427,143 B1 | 7/2002 | Isip et al. | |
| 6,434,550 B1 | 8/2002 | Warner et al. | |
| 6,446,089 B1 | 9/2002 | Brodersen et al. | |
| 6,453,314 B1 | 9/2002 | Chan et al. | |
| 6,480,848 B1 | 11/2002 | DeKimpe et al. | |
| 6,493,826 B1 | 12/2002 | Schofield et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,615,220 B1 | 9/2003 | Austin et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,714,943 B1 | 3/2004 | Ganesh et al. | |
| 6,724,399 B1 | 4/2004 | Katchour et al. | |
| 6,728,702 B1 | 4/2004 | Subramaniam et al. | |
| 6,728,747 B1 | 4/2004 | Jenkins et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,155 B1 | 8/2004 | Stegelmann | |
| 6,782,383 B2 | 8/2004 | Subramaniam et al. | |
| 6,792,462 B2 | 9/2004 | Bernhardt et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,859,926 B1 | 2/2005 | Brenner et al. | |
| 6,920,467 B1 | 7/2005 | Yoshimoto | |
| 7,103,597 B2 | 9/2006 | McGoveran | |
| 7,281,023 B2 * | 10/2007 | Lou | 707/684 |
| 7,340,411 B2 | 3/2008 | Cook | |
| 7,373,548 B2 | 5/2008 | Reinhardt et al. | |
| 7,376,675 B2 | 5/2008 | Pruet, III | |
| 7,383,246 B2 | 6/2008 | Lohman et al. | |
| 7,620,655 B2 | 11/2009 | Larsson et al. | |
| 7,647,360 B2 | 1/2010 | Kano | |
| 7,685,188 B2 * | 3/2010 | Copeland et al. | 707/684 |
| 7,792,885 B2 | 9/2010 | Piper et al. | |
| 8,145,686 B2 | 3/2012 | Raman et al. | |
| 2001/0044791 A1 | 11/2001 | Richter et al. | |
| 2002/0007363 A1 | 1/2002 | Vaitzblit | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0032678 A1 | 3/2002 | Cornwell et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0091718 A1 | 7/2002 | Bohannon et al. | |
| 2002/0103663 A1 | 8/2002 | Bankier et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0101194 A1 | 5/2003 | Rys et al. | |
| 2003/0120675 A1 | 6/2003 | Stauber et al. | |
| 2003/0145021 A1 * | 7/2003 | Parkkinen | 707/204 |
| 2003/0151633 A1 | 8/2003 | George et al. | |
| 2003/0154197 A1 | 8/2003 | Millet et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015851 A1 | 1/2004 | Newhook et al. | |
| 2004/0015981 A1 | 1/2004 | Coker et al. | |
| 2004/0027388 A1 | 2/2004 | Berg et al. | |
| 2004/0078683 A1 | 4/2004 | Buia et al. | |
| 2004/0128001 A1 | 7/2004 | Levin et al. | |
| 2004/0172385 A1 | 9/2004 | Dayal | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0203686 A1 | 10/2004 | Bahr | |
| 2004/0249854 A1 | 12/2004 | Barnes-Leon et al. | |

(56) References Cited

U.S. PATENT DOCUMENTS

| | | |
|---|---|---|
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0004918 A1 | 1/2005 | Platt |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0097078 A1 | 5/2005 | Lohman et al. |
| 2005/0097149 A1 | 5/2005 | Vaitzblit et al. |
| 2005/0165818 A1 | 7/2005 | Cole et al. |
| 2005/0182785 A1 | 8/2005 | Oswalt |
| 2005/0234842 A1 | 10/2005 | Lau et al. |
| 2005/0283485 A1 | 12/2005 | Blaicher et al. |
| 2006/0031270 A1 | 2/2006 | Nemoto et al. |
| 2006/0041584 A1 | 2/2006 | Debertin et al. |
| 2006/0101401 A1 | 5/2006 | Brumme et al. |
| 2006/0206534 A1 | 9/2006 | Banks et al. |
| 2006/0212436 A1 | 9/2006 | Gupta et al. |
| 2006/0282456 A1 | 12/2006 | Kapoor et al. |
| 2007/0050417 A1 | 3/2007 | Hasegawa et al. |
| 2007/0061279 A1 | 3/2007 | Christiansen et al. |
| 2007/0083573 A1 | 4/2007 | Gillespie |
| 2007/0143741 A1 | 6/2007 | Harris |
| 2007/0162969 A1 | 7/2007 | Becker |
| 2007/0168720 A1 | 7/2007 | Chatterjee et al. |
| 2007/0168758 A1 | 7/2007 | Kolb et al. |
| 2007/0168958 A1 | 7/2007 | Huang et al. |
| 2007/0174838 A1 | 7/2007 | Cotner et al. |
| 2007/0239797 A1 | 10/2007 | Cattell et al. |
| 2008/0052680 A1 | 2/2008 | Thebes et al. |
| 2008/0052720 A1 | 2/2008 | Barsness et al. |
| 2008/0120304 A1 | 5/2008 | Calio et al. |
| 2008/0294613 A1 | 11/2008 | Iyer et al. |
| 2008/0320330 A1 | 12/2008 | Archer et al. |
| 2009/0031169 A1 | 1/2009 | Bower et al. |
| 2011/0173619 A1 | 7/2011 | Fish |

OTHER PUBLICATIONS

Final Office Action for U.S. Appl. No. 11/678,477 dated Mar. 2, 2011, 14 pages.

Office Action for U.S. Appl. No. 11/678,500 dated May 28, 2008, 9 pages.

Office Action for U.S. Appl. No. 11/678,500 dated Jan. 29, 2009, 13 pages.

Final Office Action for U.S. Appl. No. 11/678,500 dated Oct. 26, 2009, 14 pages.

Office Action for U.S. Appl. No. 11/678,500 dated May 12, 2011, 15 pages.

Office Action for U.S. Appl. No. 12/727,464 dated Sep. 13, 2012, 15 pages.

"A Survey of Rollback-Recovery Protocols in Message-Passing Systems," by Elnozahy et al., Sep. 2002, ACM vol. 34, Issue 3, 44 pages.

"Fast-Start: Quick Fault Recovery in Oracle," by Lahiri et al., Jun. 2001, ACM, 6 pages.

International Search Report and Written Opinion for Application No. PCT/US07/080341, dated Jun. 13, 2008, 7 pages.

International Preliminary Report on Patentability for Application No. PCT/US07/080341, dated Apr. 7, 2009, 6 pages.

Office Action for U.S. Appl. No. 11/678,477 dated Oct. 23, 2009, 13 pages.

Office Action for U.S. Appl. No. 11/678,477 dated Sep. 23, 2011, 18 pages.

Office Action for U.S. Appl. No. 11/678,477 dated Jun. 21, 2010, 14 pages.

Office Action for U.S. Appl. No. 11/678,477 dated Jan. 28, 2009, 9 pages.

Office Action for U.S. Appl. No. 11/678,477 dated Apr. 5, 2012, 29 pages.

Office Action for U.S. Appl. No. 13/415,403 dated Oct. 26, 2012, 12 pages.

Notice of Allowance for U.S. Appl. No. 11/678,500 dated Dec. 12, 2011, 15 pages.

Notice of Allowance for U.S. Appl. No. 12/727,464 dated May 28, 2013, 18 pages.

Notice of Allowance for U.S. Appl. No. 13/415,403 dated Jun. 12, 2013, 12 pages.

Notice of Allowance for U.S. Appl. No. 11/678,477 dated Sep. 11, 2013, 18 pages.

* cited by examiner

METHODS AND SYSTEMS FOR BULK ROW SAVE LOGIC IN AN OBJECT RELATIONAL MAPPING LAYER AND APPLICATION FRAMEWORK

CLAIM OF PRIORITY

This United States divisional patent application claims priority to U.S. patent application Ser. No. 11/678,477 entitled "METHODS AND SYSTEMS FOR BULK ROW SAVE LOGIC IN AN OBJECT RELATIONAL MAPPING LAYER AND APPLICATION FRAMEWORK," filed Feb. 23, 2007, the entire contents of which are incorporated herein by reference; and is further related to, and claims priority to U.S. Provisional Patent Application No. 60/849,693 entitled "METHOD FOR IMPLEMENTING BOTH BULK AND ROW BASED SAVE LOGIC IN AN OBJECT RELATIONAL MAPPING LAYER AND APPLICATION FRAMEWORK," filed Oct. 4, 2006, the entire contents of which are incorporated herein by reference. This United States divisional patent application is further related to U.S. patent application Ser. No. 11/678,500, now U.S. Pat. No. 8,161,010 entitled "METHODS AND SYSTEMS FOR PROVIDING FAULT RECOVERY TO SIDE EFFECTS OCCURRING DURING DATA PROCESSING," filed Feb. 23, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing bulk row save logic in an object relational mapping layer and application framework.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. During this process, data may be transformed through various formats and protocols in the various tiers of the system: from XML or HTML text to Java Objects to relational data structures and back again. In particular the latter transition is known in the industry as the O/R (object/relational) boundary and is the subject of much developer headache and 3rd party development tool support (because the representation one uses typically in a procedural language like Java, for a complex object, is typically quite different from the optimal manner in which that data is stored and indexed in a relational database (which is the dominant location for enterprise data of this sort)).

Unfortunately, conventional 3rd party approaches to lower-level O/R processing do not support save operations performed in bulk, becoming inefficient if, for example, the number of items to be saved to the database system is relatively high.

Accordingly, it is desirable to provide techniques enabling an API of the database system to improve performance and provide greater robustness of the database system.

BRIEF SUMMARY

In accordance with embodiments, there are provided mechanisms and methods for saving multiple rows together through an object relational mapping layer to a database. These mechanisms and methods for saving multiple rows together can enable embodiments to detect faults in the save operation(s) and recover. The ability of embodiments to detect faults in the save operation(s) and recover can enable embodiments to provide a robust forgiving published API that saves a set of rows together whenever possible.

In an embodiment and by way of example, a method for saving multiple rows together through an object relational mapping layer to a database is provided. The method embodiment includes receiving, at an API in a known start state, a set of rows to save together. The set of rows is saved together until each row in the set of rows has been saved. A new set of rows is formed from the set of rows by removing rows associated with faulting during saving. The saving and forming can be repeated using the new set of rows until a set of rows that can be saved from the known start state without fault is determined. When a set of rows that can be saved from the known start state without fault is determined, then the set of rows may be committed.

In another embodiment and again by way of example, a method for providing fault recovery to side effects occurring during data processing is provided. The method embodiment includes detecting a fault in processing a set of rows of a database. At least one of the set of rows includes at least one side effect. Each of the set of rows processed can be rolled back and processing retried on a subset of the set of rows in which rows associated with faults have been removed until a subset of the set of rows in which each row of the subset of rows is able to be processed. The subset of rows may be processed to the database and the at least one side effect executed, thereby ensuring that no side effects have occurred from executing code on behalf of any rows associated with a fault.

While the present invention is described with reference to an embodiment in which techniques for saving multiple rows together are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for saving multiple rows together through an object relational mapping layer to a database. Saving multiple rows together can enable embodiments to detect faults in the save operation(s) and recover. Embodiments may recover from faults by forming a new set of rows by removing rows associated with faulting save operations and repeating the saving and forming operations using the new set of rows until a set of rows that can be saved from the known start state without fault is determined. When the subset of successful rows is found, embodiments are able to provide assurance that no side effects (i.e., code or operations triggered by saving of a data to a particular location) have been executed on behalf of any of the failed rows (side effects from custom PL/SOQL code included) by deferring execution of triggers until an entire set of rows can be saved and committed.

When a rollback of save operations occurs responsive to a fault detected in one or more save operations, a whole service notion of rollback—including rollback of governor limits (i.e., limits placed on resource usage)—can be performed.

Rollback of an entire service provides a simple and easy to understand programming model to the user because users do not need to worry about the retry logic itself using up resource limits in unpredictable ways.

Embodiments process data from clients using a bulk array for efficiency and speed, including techniques in multiple programming environments and languages. As an example, a client-side Simple Object Access Protocol (SOAP) API embodiment saves can be specified as arrays of objects to encourage efficient use of Internet round trips.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for saving multiple rows together through an object relational mapping layer to a database will be described with reference to example embodiments.

System Overview

Figure 1:
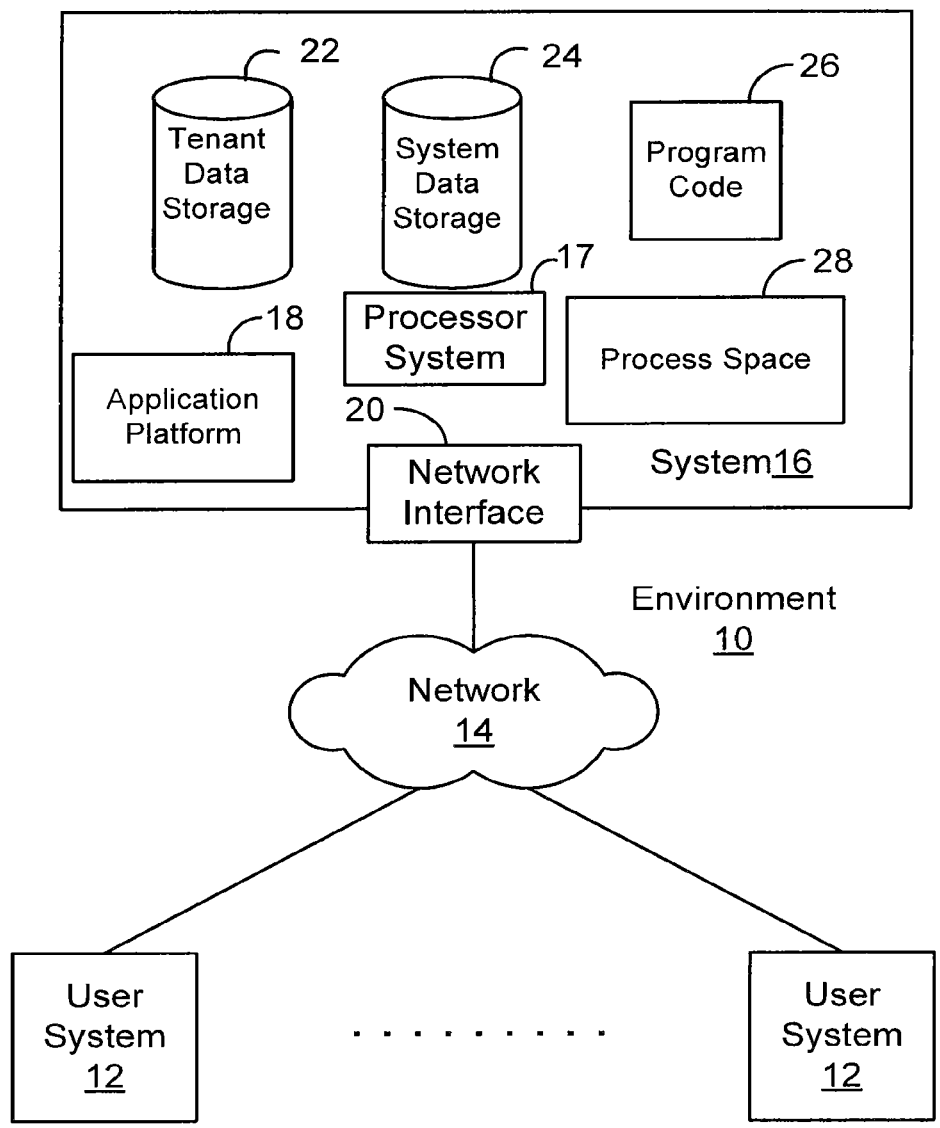
FIG. 1 illustrates a block diagram of an example of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
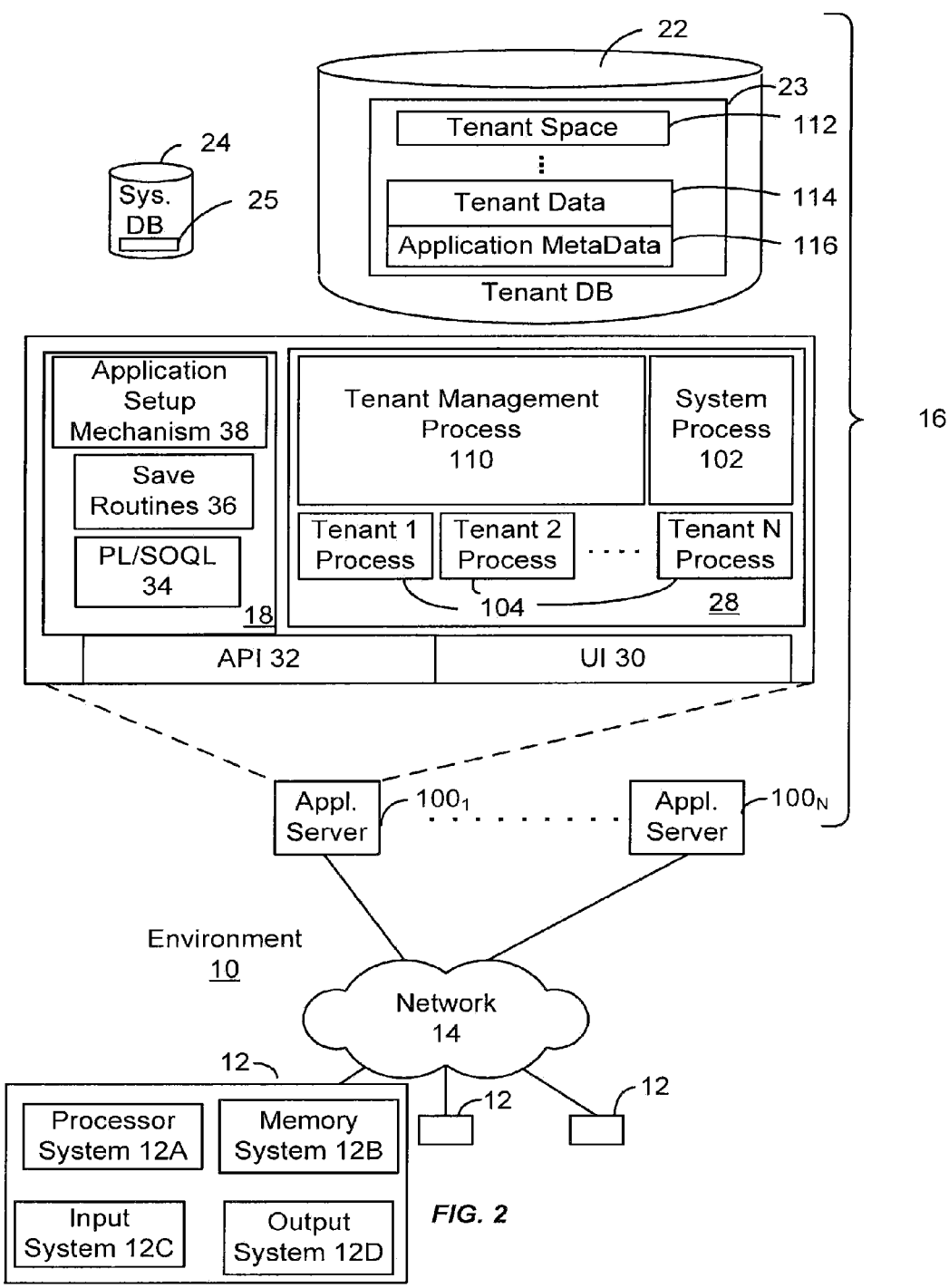
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one, or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will first describe a high level overview of a technique for saving multiple rows together in accordance with aspects and embodiments of the present invention. An example of detecting and recovering from failures in a save of multiple rows is then detailed. Following the example of detecting and recovering from failures, examples of some of the many types of operations that may be performed together in sets according to the techniques described herein are provided.

Figure 3A:
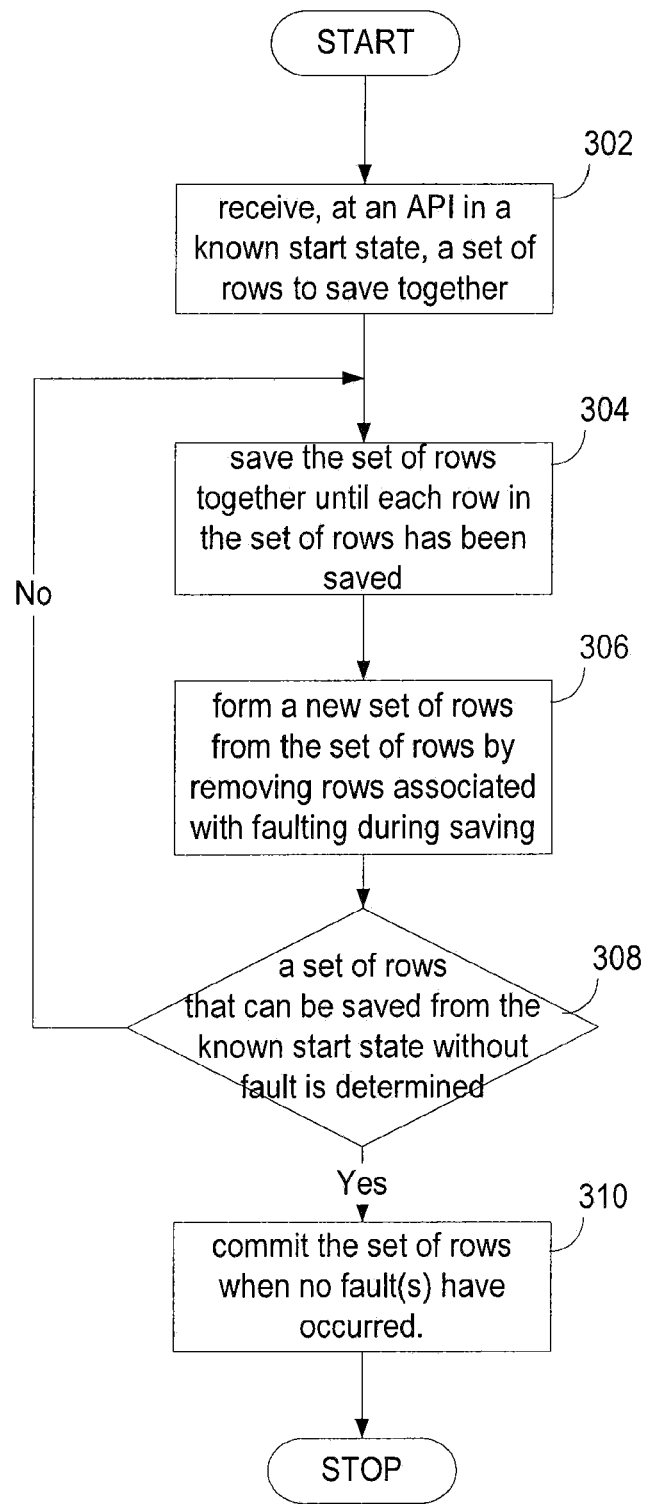
FIG. 3A illustrates an operational flow diagram of a high level overview of a technique for saving multiple rows together in an embodiment.

FIG. 3 illustrates an operational flow diagram of a high level overview of a technique for saving multiple rows together in an embodiment. In one embodiment, the technique for saving multiple rows together shown in FIG. 3 is operable with an implemented in the multi-tenant database system 16. As shown in FIG. 3, a set of rows to save together is received (block 302) at an API in a known start state. For example and without limitation, this can include receiving information to save to a set of rows in a Simple Object Access Protocol (SOAP) transaction.

The set of rows is saved (block 304) together until each row in the set of rows has been saved. By way of example and without limitation, this can include recording fault information for any row associated with a save operation that faults. A new set of rows is formed (block 306) from the set of rows by removing rows associated with faulting during saving. In embodiments, this can include removing rows corresponding to faults from the set of rows to save together to form the new set of rows to save together.

The saving (block 304) and forming (block 306) can be repeated (block 308) using the new set of rows until a set of rows that can be saved from the known start state without fault is determined. This can include rolling back saving the set of rows to the known start state. Embodiments may roll back governor limits (i.e., resource limitations) placed upon code executing on behalf of rows that are being rolled back in order to prevent resource allocations from being used up by user's trying a procedure, detecting a failure and then rolling back the procedure in the user's code. A detailed description of governor limits in PL/SOQL language embodiments may be found in commonly owned co-pending U.S. Provisional Patent Application 60/828,757 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 9, 2006, which is incorporated in its entirety herein for all purposes.

When a set of rows that can be saved from the known start state without fault is determined, then the set of rows may be committed (block 310). By executing side effects, such as code or operations execution is triggered by saving or other operations performed on data to certain rows, only after a set of rows is successfully saved and committed, the process of determining that a set of rows can be saved without incurring a fault enables embodiments to ensure that no side effects have occurred from executing code on behalf of any rows failing to be saved.

Figure 3B:
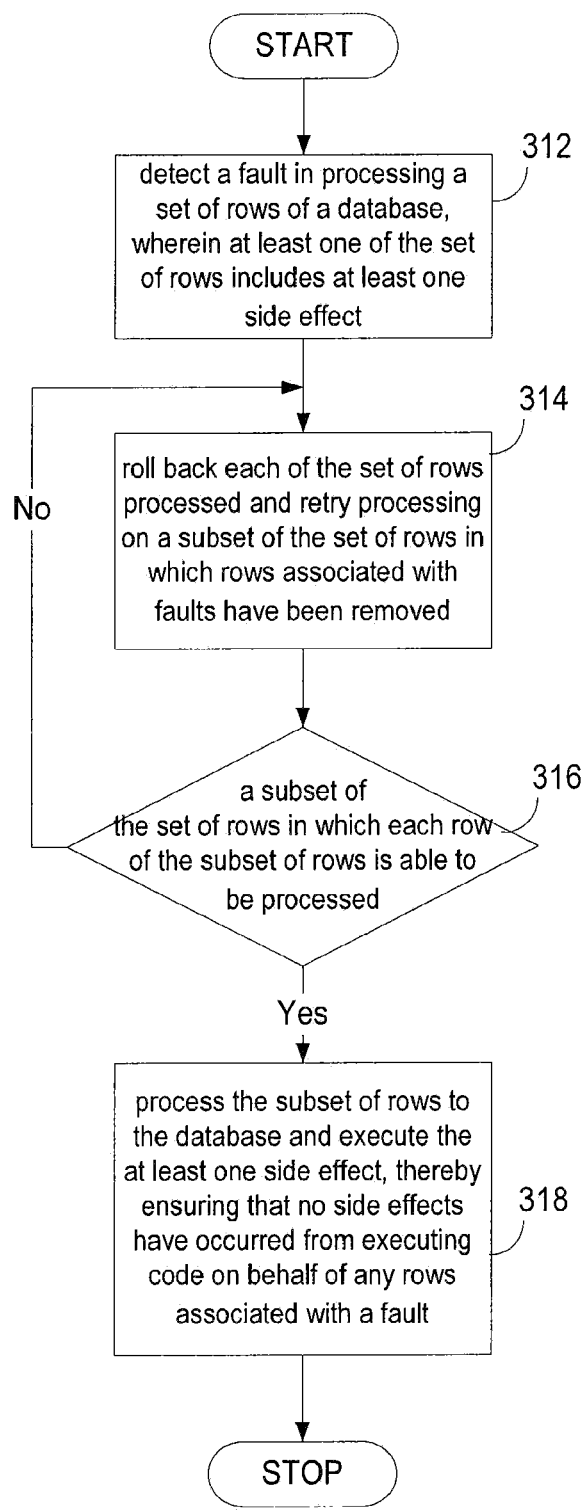
FIG. 3B illustrates an operational flow diagram of a high level overview of a technique for providing fault recovery to side effects occurring during data processing in an embodiment.

FIG. 3B is an operational flow diagram illustrating a high level overview of a technique for providing fault recovery to side effects occurring during data processing in an embodiment. A fault in processing a set of rows of a database is detected (block 312). At least one of the set of rows includes at least one side effect. For example and without limitation, this can include at least one of a pre-operation trigger, a post-operation trigger, or a code snippet. Each of the set of rows processed is rolled back (block 314) and processing is retried on a subset of the set of rows in which rows associated with faults have been removed until a subset of the set of rows in which each row of the subset of rows is able to be processed (block 316). By way of example and without limitation, this can include rolling back governor limits placed upon code executing on behalf of rows that are being rolled back. The subset of rows is processed (block 318) to the database and the at least one side effect is executed, thereby ensuring that no side effects have occurred from executing code on behalf of any rows associated with a fault. In embodiments, this can include updating resources used and checking against governor limits.

Figure 4A:
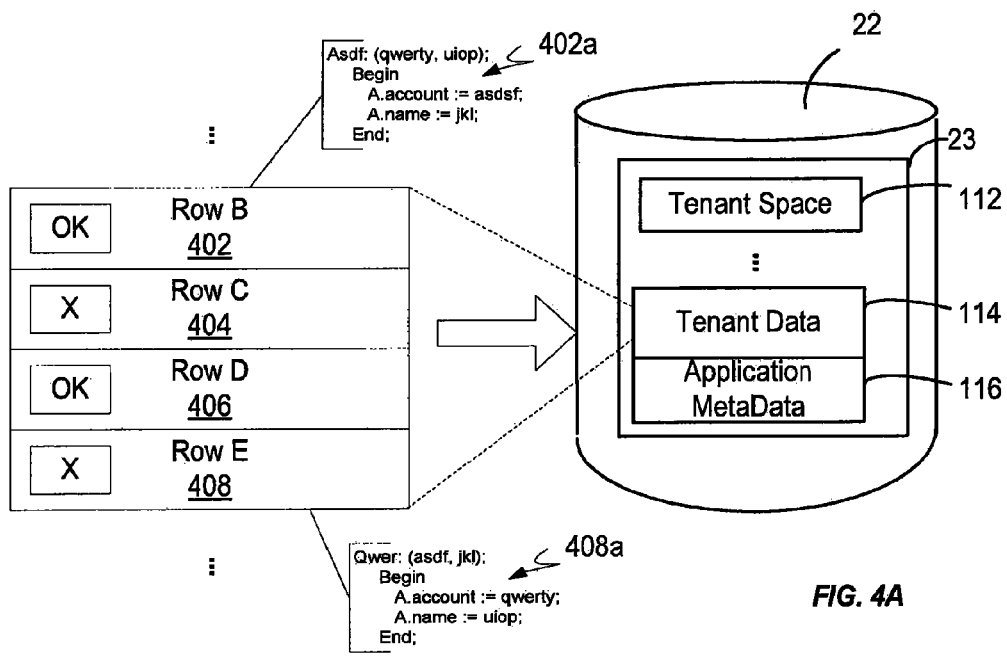
FIGS. 4A-4B illustrate block diagrams of an example of a technique for saving multiple rows together in an embodiment.
Figure 4B:
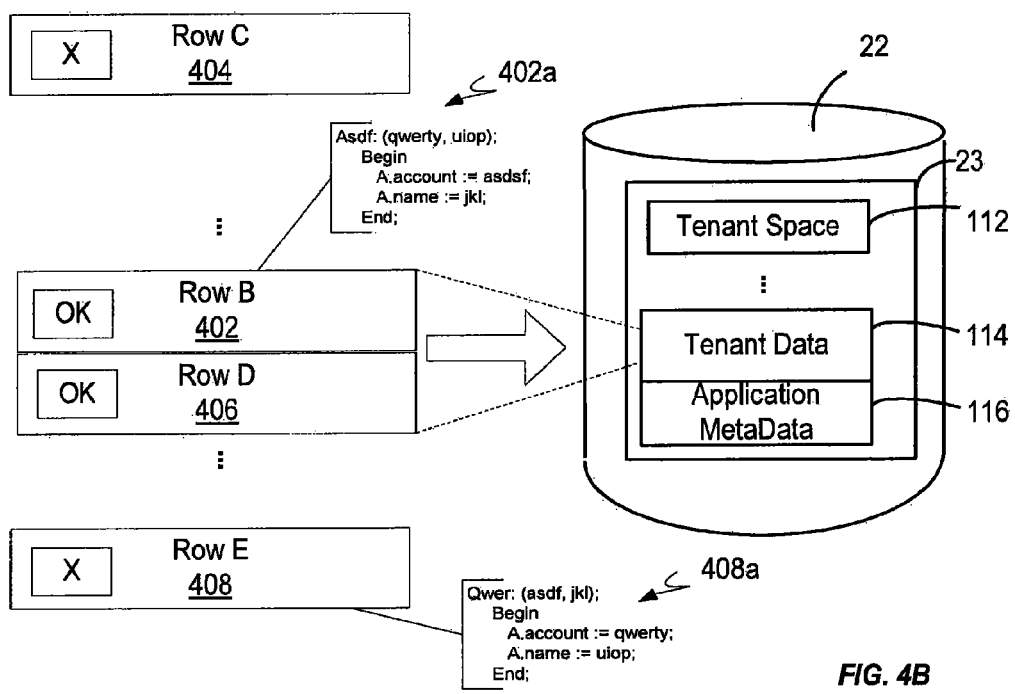

FIGS. 4A-4B illustrate block diagrams of an example of a technique for saving multiple rows together in an embodiment. In FIG. 4A, a set of rows 402-408 are to be saved together into a tenant data area 114 of database 22 of FIG. 2. Rows 402 and 408 have side effects associated with them, namely code snippet 402a is triggered to execute prior to saving row 402. Code snippet 402a could also be triggered after saving 402 or any other of a variety of trigger configurations. Similarly, row 408 includes a code snippet 408a that is triggered to execute prior to saving row 408. Again, other types of triggers could be used, but pre-saving triggers are selected for this example for illustrative purposes.

Again with reference to FIG. 4A, in an embodiment and by way of example, a first attempt to save rows 402-408 results in failure reports ("x") being returned for row C 404 and row E 408. Because one or more failure reports have been received responsive to an attempted save operation, the save operations of rows 402-408 are rolled back to the starting state. Further, any side effects 402a, 408a that were permitted to execute are also rolled back. Additionally, any resource usage counted against governor limits by executing side effects 402a, 408a is also rolled back.

Now with reference to FIG. 4B, a second attempt is made to find a block of rows that can be saved without receiving failure reports. As illustrated in FIG. 4B, row C 404 and row E 408 are removed from the set of rows that the system is attempting to save to the tenant data 114 of database 22 because row C 404 and row E 408 are associated with a prior failing save operation. Now a new set of rows, including row B 402 and row D 406 are saved to tenant data 114, resulting in good return codes ("ok"). Accordingly, the system will once again roll back the save, execute any code or operations associated with pre-save triggers corresponding to rows to be saved, such as snippet 402a, perform a save of the block of rows and then commit the saved rows. In the foregoing example, the process of determining that a set of rows can be saved without incurring a fault enables embodiments to ensure that no side effects have occurred from executing code on behalf of any rows failing to be saved.

Bulk processing techniques provided by embodiments described herein can extend to processing any of the following operations in bulk: (i) processing and packaging of the API messages themselves; (ii) internal object representation as a list of rows being operated upon; (iii) INSERT routines in PL/SQL; (iv) Lookup routines for de-duplicate matching when doing record updates; (v) UPDATE routines in PL/SQL for record changes; (vi) DELETE routines in PL/SQL; (vii) INSERT, UPDATE, DELETE routines include semantically complicated bookkeeping routines, all in bulk, such as: (a) MRU (most-recently used list) maintenance; (b) Row-level sharing maintenance; and (c) Entity store count maintenance; (viii) Reload of data after an update in preparation for performing post-save logic (known as workflow); and (ix) Workflow implementation itself, including the bulk queue and processing of tasks such as Email, child row creation, outbound SOAP messages, and the like. Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method performed in a host system having a database therein to store rows and a processor to execute operations, wherein the method comprises:

saving a plurality of rows in the database as a set of rows, wherein one or more of the plurality of rows is associated with at least one side effect that is triggered to execute prior to saving or after saving but prior to committing the one or more rows, and wherein the one or more side effects comprises at least one of a pre-operation trigger, a post-operation trigger, or a code snippet;

determining that one or more faults has occurred in saving the set of rows in the database; rolling back the set of rows to a known start state;

rolling back any side effects that were permitted to execute;

rolling back any resource usage counted against governor limits by executing side effects;

forming a new set of rows at the known start state including any of the plurality of rows which are not associated with the one or more faults having occurred when saving the set of rows in the database by removing all rows associated with the one or more faults during the saving of the set of rows in the database;

saving the new set of rows in the database from the known start state without fault; and updating resources used and checking against governor limits.

2. The method of claim 1, further comprising:
receiving the set of rows via an Application Programming Interface (API) of the host system, wherein the set of rows are to be saved together in the database.

3. The method of claim 2, wherein receiving the set of rows comprises receiving information via the API to save to the set of rows together as part of a Simple Object Access Protocol (SOAP) compatible transaction.

4. The method of claim 2, wherein the API implements an object relational mapping layer to the database.

5. The method of claim 1, wherein the host system provides access to data and applications hosted by the host system to a user interface device over a public Internet as part of an on-demand database service.

6. The method of claim 5, wherein the database comprises a multi-tenant database system having elements of hardware and software shared by multiple customers.

7. The method of claim 1, further comprising:
recording fault information for any row associated with a save operation that faults when saving the set of rows in the database; and
wherein forming the new set of rows by removing all rows associated with the one or more faults during the saving of the set of rows in the database is based on the fault information recorded.

8. The method of claim 1, further comprising:
repeating the determining that one or more faults has occurred and forming the new set of rows until a set of rows that can be saved from the known start state without fault is determined.

9. The method of claim 8, wherein repeating the determining and the forming further comprises repeating the rolling back the set of rows to a known start state, repeating the rolling back of any side effects that were permitted to execute, and repeating the rolling back any resource usage counted against governor limits by executing side effects.

10. The method of claim 1, wherein rolling back any side effects that were permitted to execute comprises rolling back code or operations whose execution was triggered by saving the set of rows and/or rolling back any operations performed on data within other rows in the database triggered by saving the set of rows.

11. The method of claim 1, wherein saving the new set of rows in the database from the known start state without fault comprises saving the new set of rows in the database without receiving a failure report or saving the new set of rows in the database and receiving good return codes corresponding to the saving of the new set of rows, or both.

12. The method of claim 1, wherein saving the plurality of rows in the database as the set of rows constitutes bulk queuing and bulk processing of the set of rows.

13. The method of claim 12, wherein the bulk processing of the set of rows comprises at least one of:
(i) processing and packaging of Application Programming Interface (API) messages;
(ii) mapping to internal object representation as a list of rows being operated upon;
(iii) INSERT routines to the database using PL/SQL (Procedural Language/Structured Query Language);
(iv) lookup routines in the database for de-duplicate matching when performing updates to the rows stored in the database;
(v) UPDATE routines to the database using PL/SQL for record changes to the rows stored in the database;
(vi) DELETE routines to the database using PL/SQL for the rows stored in the database;
(vii) MRU (most-recently used list) maintenance for the database;
(viii) row-level sharing maintenance for the rows stored in the database;
(ix) entity store count maintenance for the rows stored in the database;
(x) reloading data after an update in preparation for performing post-save logic as part of a workflow; and
(xi) workflow implementation for bulk queuing and processing of tasks including child row creation, email processing, and outbound Simple Object Access Protocol (SOAP) messages.

14. The method of claim 1, further comprising:
committing the new set of rows when no faults have occurred.

15. Non-transitory machine-readable storage media having instructions stored thereupon that, when executed by a processor of a host system, the instructions cause the host organization to perform operations including:
saving a plurality of rows in a database as a set of rows, wherein one or more of the plurality of rows is associated with at least one side effect that is triggered to execute prior to saving or after saving but prior to committing the one or more rows, and wherein the one or more side effects comprises at least one of a pre-operation trigger, a post-operation trigger, or a code snippet;
determining that one or more faults has occurred in saving the set of rows in the database;
rolling back the set of rows to a known start state;
rolling back any side effects that were permitted to execute;
rolling back any resource usage counted against governor limits by executing side effects;
forming a new set of rows at the known start state including any of the plurality of rows which are not associated with the one or more faults having occurred when saving the set of rows in the database by removing all rows associated with the one or more faults during the saving of the set of rows in the database;
saving the new set of rows in the database from the known start state without fault; and
updating resources used and checking against governor limits.

16. The non-transitory machine-readable storage media of claim 15:
wherein the host system provides access to data and applications hosted by the host system to a user interface device over a public Internet as part of an on-demand database service; and
wherein the database comprises a multi-tenant database system having elements of hardware and software shared by multiple customers.

17. The non-transitory machine-readable storage media of claim 15:
wherein saving the plurality of rows in the database as the set of rows constitutes bulk queuing and bulk processing of the set of rows; and
wherein the bulk processing of the set of rows comprises at least one of:
(i) processing and packaging of Application Programming Interface (API) messages;
(ii) mapping to internal object representation as a list of rows being operated upon;
(iii) INSERT routines to the database using PL/SQL (Procedural Language/Structured Query Language);
(iv) lookup routines in the database for de-duplicate matching when performing updates to the rows stored in the database;

(v) UPDATE routines to the database using PL/SQL for record changes to the rows stored in the database;
(vi) DELETE routines to the database using PL/SQL for the rows stored in the database;
(vii) MRU (most-recently used list) maintenance for the database;
(viii) row-level sharing maintenance for the rows stored in the database;
(ix) entity store count maintenance for the rows stored in the database;
(x) reloading data after an update in preparation for performing post-save logic as part of a workflow; and
(xi) workflow implementation for bulk queuing and processing of tasks including child row creation, email processing, and outbound Simple Object Access Protocol (SOAP) messages.

18. A host system comprising:
a processor to execute operations;
a database to store rows;
a network interface communicably connecting the host system with user interface devices via a network; and
one or more stored sequences of instructions which, when executed by the processor, cause the processor to perform operations comprising:
saving a plurality of rows in the database as a set of rows, wherein one or more of the plurality of rows is associated with at least one side effect that is triggered to execute prior to saving or after saving but prior to committing the one or more rows, and wherein the one or more side effects comprises at least one of a pre-operation trigger, a post-operation trigger, or a code snippet;
determining that one or more faults has occurred in saving the set of rows in the database;
rolling back the set of rows to a known start state;
rolling back any side effects that were permitted to execute;
rolling back any resource usage counted against governor limits by executing side effects;
forming a new set of rows at the known start state including any of the plurality of rows which are not associated with the one or more faults having occurred when saving the set of rows in the database by removing all rows associated with the one or more faults during the saving of the set of rows in the database;
saving the new set of rows in the database from the known start state without fault; and
updating resources used and checking against governor limits.

19. The host system of claim 18:
wherein the network constitutes a public Internet;
wherein the host system provides access to data and applications hosted by the host system to a user interface device over the public Internet as part of an on-demand database service; and
wherein the database comprises a multi-tenant database system having elements of hardware and software shared by multiple customers.

20. The host system of claim 18:
wherein saving the plurality of rows in the database as the set of rows constitutes bulk queuing and bulk processing of the set of rows; and
wherein the bulk processing of the set of rows comprises at least one of:
(i) processing and packaging of Application Programming Interface (API) messages;
(ii) mapping to internal object representation as a list of rows being operated upon;
(iii) INSERT routines to the database using PL/SQL (Procedural Language/Structured Query Language);
(iv) lookup routines in the database for de-duplicate matching when performing updates to the rows stored in the database;
(v) UPDATE routines to the database using PL/SQL for record changes to the rows stored in the database;
(vi) DELETE routines to the database using PL/SQL for the rows stored in the database;
(vii) MRU (most-recently used list) maintenance for the database;
(viii) row-level sharing maintenance for the rows stored in the database;
(ix) entity store count maintenance for the rows stored in the database;
(x) reloading data after an update in preparation for performing post-save logic as part of a workflow; and
(xi) workflow implementation for bulk queuing and processing of tasks including child row creation, email processing, and outbound Simple Object Access Protocol (SOAP) messages.

* * * * *